United States Patent
Patel

(10) Patent No.: US 8,935,342 B2
(45) Date of Patent: Jan. 13, 2015

(54) METHOD FOR DETECTING AND UNSUBSCRIBING AN ADDRESS FROM A SERIES OF SUBSCRIPTIONS

(76) Inventor: Henal Patel, Houston, TX (US)

( * ) Notice: Subject to any disclaimer, the term of this patent is extended or adjusted under 35 U.S.C. 154(b) by 287 days.

(21) Appl. No.: 13/417,174

(22) Filed: Mar. 9, 2012

(65) Prior Publication Data

US 2013/0238721 A1 Sep. 12, 2013

(51) Int. Cl.
*G06F 15/16* (2006.01)
(52) U.S. Cl.
USPC .......................................... 709/206; 709/200
(58) Field of Classification Search
USPC ........................................ 709/206, 223, 200
IPC .................................................. H04L 65/4023
See application file for complete search history.

(56) References Cited

U.S. PATENT DOCUMENTS

| | | | |
|---|---|---|---|
| 2003/0167250 A1* | 9/2003 | Sash .................................. 707/1 |
| 2004/0193690 A1* | 9/2004 | Nagai ........................... 709/206 |
| 2010/0205259 A1* | 8/2010 | Vitaldevara et al. .......... 709/206 |
| 2013/0159082 A1* | 6/2013 | Abbott et al. .............. 705/14.25 |

* cited by examiner

*Primary Examiner* — El Hadji Sall
(74) *Attorney, Agent, or Firm* — Kevin M. Jones

(57) ABSTRACT

A method for detecting and unsubscribing one or more addresses from a series of subscriptions by examining the emails in the mailbox of the address and determining if they are from a subscription/automated mailing/list server by examining the header contents, the sender's address, the subject, the body and comparing each message to other messages to identify patterns. Then, examining each message to identify methods of unsubscribing from the Subscription. Finally, unsubscribing from the Subscriptions either automatically, or in a semi-manual method and optionally deleting all messages associated with the Subscription.

17 Claims, 4 Drawing Sheets

METHOD FOR DETECTING AND UNSUBSCRIBING AN ADDRESS FROM A SERIES OF SUBSCRIPTIONS

CROSS-REFERENCE TO RELATED APPLICATIONS

This application does not claim propriety to any other provisional, non-provisional, or foreign applications. This application is a first filing by the inventor.

STATEMENT REGARDING FEDERALLY SPONSORED RESEARCH OR DEVELOPMENT

This application is not related to any federally sponsored research and development, and as of the time of filing, there are no rights to the invention subject to claim by anyone other than the inventor.

BACKGROUND OF THE INVENTION

Subscriptions, as the term is utilized in this application, describes the inclusions of a specific email address in an electronic mailing list. An electronic mailing list is a special usage of email that allows for widespread distribution of information to many Internet users. A software system, mail Server or "Post Office," receives email at a single address, called the "reflector." The Post Office then sends a copy of that message to all the subscribers on the list. In common usage the term "electronic mailing list" may refer to one of four things, the list of email addresses ("List"), the people ("Subscribers") receiving mail at those addresses, the publications ("Email Messages" or "Messages") sent to those addresses, and the target email address (the "Reflector").

Subscriptions offer users a way to keep up with information of a particular topic to which the Mailing List is created to serve. Some Mailing List are devoted to hobbies, emerging technology, political candidates, clubs, etc. Many people subscribe without realizing it, or intend to subscribe for a short time period and then forget the messages are coming from a subscription and they have the option of stopping them. When you purchase a product online, you may have agreed to subscribe to the store's Mailing List. By registering for a website or registering a product, one may find themselves on a subscription notifying them of similar products, accessories, updates, recalls, etc. Some groups maintain contact with members by way of subscriptions. Although the mailer may have obtained the requisite opt-in requirements compliant with the U.S. CAN-SPAM Act, the user may still not intend to subscribe to various subscriptions and distribution lists ("Subscriptions"). The increased reliance on ecommerce compounded by said commercial marketing practices appear to have increased the number of undesirable electronic messages. Overtime, the quantity of email subscription lists becomes less important, distracting, and unmanageable for a user.

The problem arises when multiple Subscriptions begin to overwhelm a mailbox. Some Mailing List hide the fact that they are a mailing list, so the messages just appear to be SPAM messages, rather than those which were solicited, with purpose or accidentally. Some Subscriptions have a very high message rate and users who do not regularly read their email may find their system overloaded in a few days.

Unsubscribing from such email subscription lists can be time consuming and complicated. Because mailers have different methods of allowing a user to unsubscribe, users are confused about the methods and have a difficult time opting out or "cleaning" out such email. For example, some mailers include a list-unsubscribe header which requires the user to respond to the mailer with certain keywords in the subject or body. Second, some mailers require the user click and "opt out", "unsubscribe", or "email preference" link at the bottom of an email. A third method requires a user to respond via a reply-to method. Therefore, the ability to manage email subscriptions lists in bulk may seem unmanageable.

Although SPAM filters assist users in automatically classifying information as it arrives, a user's prior interaction with a certain goods or service provider may render such filtering undesirable and inaccurate. For example, marking a subscription list email as spam may cause product or service purchase receipts to be labeled as spam as well, thereby causing the user to miss important information which was filtered inadvertently. Further, mailing list may have been desirable at one previous point in time, but are now undesirable to the user.

DETAILED DESCRIPTION OF THE PREFERRED EMBODIMENTS

Described herein is a method for detecting and unsubscribing an address from a series of subscriptions. A computing system is programmed such that a user may identify email accounts and settings to allow the system to access the email accounts and examine the contents of the accounts' ("Mailboxes"/"Postal Boxes") therein. The system attempts to identify emails which are from Subscription services and then to identify from the messages the method of unsubscribing from the messages. The system is then configured to group the messages by Subscription which sent them. Further the system is configured to group the identified methods of unsubscribing by Subscription.

Each email may potentially be part of a Subscription. By examining in detail the header and possibly the contents of the email, it can be determined if it is a Subscription email. Different Subscriptions have different methods for unsubscribing. For some Subscriptions a user may control their settings by sending emails to a specific target address or "mailto:". Such target addresses are monitored by people or computing systems which will take specific actions based on the email contents. The most common method is to send an email to the target email address with a subject line of "Unsubscribe". The body of such an email is irrelevant and often ignored by the receiver.

Other unsubscribe actions for Subscriptions are controlled via a website. In such systems the user would need to visit a specific Universal Resource Locator "URL" and may be required to take further actions such as submitting their own email address, or clicking on a "Unsubscribe" button, etc. to affect the email settings.

Once the emails of one or more email accounts have been examined, the system presents to the user a list of all subscriptions identified for each email account. The user may select a plurality of Subscriptions to unsubscribe. Further the user may have the opportunity to select all of the Subscriptions at one time by activating a "Select all" button, or a similar control.

Once the user has determined which Subscriptions are to be unsubscribed, the system attempts to use any associated methods to unsubscribe from each Subscription. Once a successful unsubscription occurs, the system may ignore any remaining methods of unsubscription for the specific Subscription. The user may be given the opportunity to delete from the mailbox any messages which have been identified with the unsubscribed Subscription.

Figure 1:
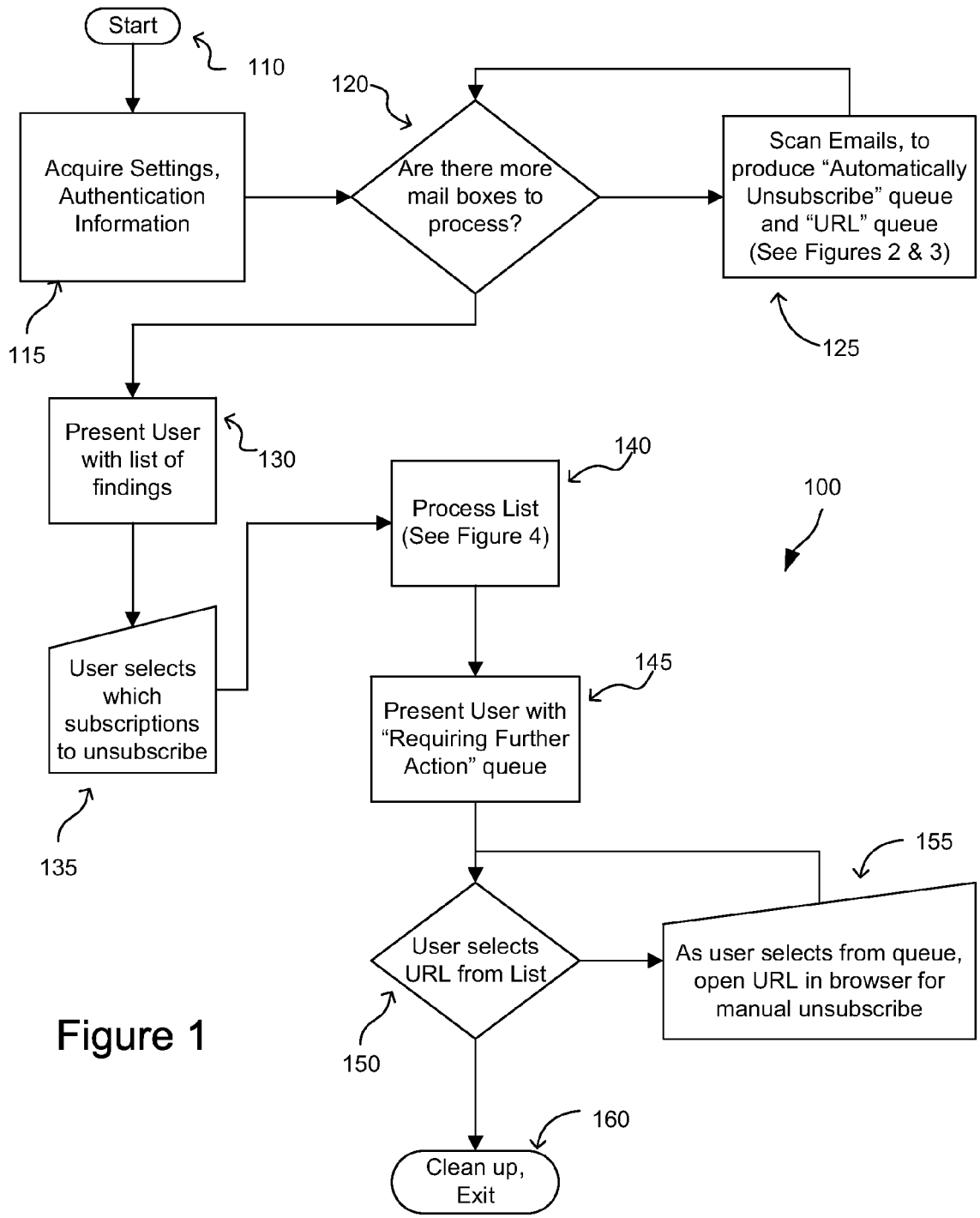
FIG. 1 illustrates the process for identifying and unsubscribing from multiple subscriptions in accordance with an exemplary embodiment of the invention.

FIG. 1 illustrates the process for identifying and unsubscribing from multiple subscriptions in accordance with an exemplary embodiment of the invention. To start the process (110), the Email Addresses will need to be supplied by a user, and the settings for accessing the mail boxes should be determined (115). One method of doing this would be to inquire of the user.

However, one skilled in the art would appreciate that this information may be readily available in other applications on the computing system. For instance, an email program would already contain this information about each account for which the email program has been configured. Further large mailbox providers (e.g. gmail, hotmail, sbcglobal) use the same settings for all accounts. Therefore when an account host has been determined by examination of the email address, the additional settings necessary to locate and connect to the mailbox may be readily identifiable. Thus, only an email address and password may need to be obtained from a user.

The system then processes each mailbox in sequence (120) to determine which subscriptions can be identified by messages in the mailbox (125). As part of the process for identifying Subscriptions, methods of unsubscribing are determined from the message's contents and/or headers. In some instances, the method for unsubscribing will be readily apparent as many Subscriptions provide convenient ways to unsubscribe through a "List-Unsubscribe" header. The List-Unsubscribe header is an optional text entry that email publishers and marketers can include in the header portion of the messages they send. Recipients do not see the header itself; they see an Unsubscribe button they can click if they would like to automatically stop future messages. The List-Unsubscribe header has been widely adopted by software vendors and Internet Service Providers ("ISPs").

List-Unsubscribe headers may support either email based ("mailto") or web based ("http") methods of unsubscribing from the list. An example of a mail to List-Unsubscribe header may be:
List-Unsubscribe: <mailto:unsubscribe-samplelist@domain.com>
An example of a web based (http) List-Unsubscribe header may be:
List-Unsubscribe: <http://domain.com/unsubscribe/?listname=samplelist@domain.com ?id=7750567>
In both of the above instance a user will be unsubscribed from a Subscription with a reflector of samplelist@domain.com. In the first instance the user wishing to unsubscribe will be identified because the subscription email will have the user identified as the sender. In the second instance the user wishing to unsubscribe is identified by an id which is embedded in the link and passed to the server as part of the Uniform Resource Locator.

Once all mailboxes have been processed (120) and the Subscriptions and their unsubscribe methods identified (125), the user is presented a list of the findings (130) in which the user may select which emails should be unsubscribed (135). Note that there may be several emails associated with a single Subscription. The system attempts to identify which emails are parts of the same subscription and present the information to the user in a manner that they can make an informed decision about the Subscription. Each Subscription should be presented only once in the list so that the user cannot make conflicting selections. Once the user has selected which Subscriptions should be unsubscribed, the list is processed (140). Processing the list involves utilizing the unsubscribe methods identified for each Subscription. Some Subscriptions may not be automatically unsubscribed by the system, as their procedure may be more complex. Those Subscriptions are identified and presented to the user as a list of Subscriptions which require further action (145). The user selects the emails from the list (150), and the program opens the URLs in a browser, one at a time so the user may easily complete the more complex unsubscription process (155). Once all Subscriptions have been processed, or the user has chosen to not process certain Subscriptions, the user may exit the system. This involves clean up as well as exiting (160). Clean up allows a user to delete, from their mailbox, all emails associated with Subscriptions which have been unsubscribed. One skilled in the art would appreciate that other standard clean up would also occur such as erasing temporary files, saving states for the next execution, closing windows, releasing system resources, etc.

Figure 2:
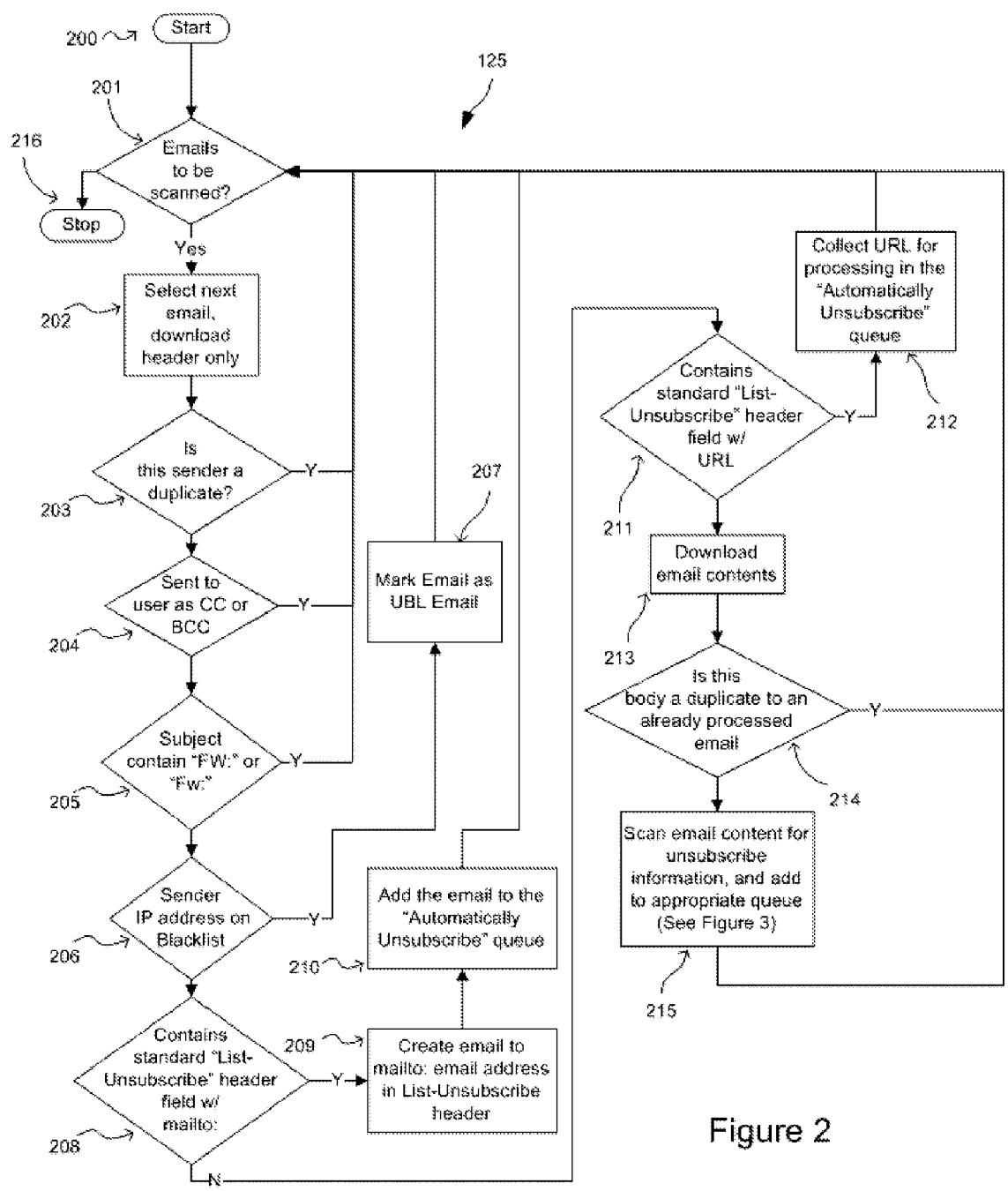
FIG. 2 illustrates a method for identifying subscriptions and collecting the information necessary to unsubscribe from each subscription in accordance with an exemplary embodiment of the invention.

FIG. 2 illustrates a method for identifying subscriptions and collecting the information necessary to unsubscribe from each subscription in accordance with an exemplary embodiment of the invention. To scan a mailbox for Subscriptions is a complex process which starts (200) by examining the emails individually (201). For each email, the header is retrieved (202).

Duplicate emails are identified (203). To accomplish this, the email is then compared against a list of other senders whom have already been processed. If the sender is on the list of Subscriptions already found, then the method of unsubscribing for the Subscription has already been determined by processing the earlier email in which the Subscription was identified. If the sender is on the list of other emails which have already been determined to not be part of a Subscription, then no further action is required.

Non Subscriptions are identified. If the message was sent to the user as a carbon copy ("CC") message or a blind carbon copy ("BCC") message (204) then it is assumed not to be a Subscription since subscription software adds users as direct targets by placing their name in the "TO" header. At this point the sender's name would be placed on the Non-Subscription list and further emails from this user would be identified as duplicate emails, as stated above.

If the message was sent to the user as a forward (205) then it is assumed not to be a Subscription. Forwards are identified because most email editors propend to prepend the subject of forwarded messages with "FW:" or "Fw:" to indicate to the received that it is a forwarded message. Further email editors tend to prepend the subject of reply messages with "RE:" or "Re:" for the same reason. In either instance the user appears to carry on a correspondence with the sender and therefore the sender is presumed not to be a Subscription. The sender's name would be placed on the Non-Subscription list and further emails from this user would be identified as duplicate emails, as stated above.

Next the sender's Internet Protocol ("IP") address is compared against a list of known harmful senders (206). Some senders send malicious emails which use harmful unsubscribe tactics via suppression URLs. These senders' IP addresses are quickly identified by the Internet community and various services maintain list of such senders so that their tactics can be exposed. Such lists are known as "Blacklist." The system may have a copy of such a Blacklist with which to compare each sender's IP address. Any emails found to be on a Blacklist are marked by adding to a Unsubscribe Black List ("UBL") (207) so that they can be presented to the user to make them aware of the potential threat on their system.

One skilled in the art would appreciate that in addition to using online look up capabilities to identify if an address is on a Blacklist, one could also utilize other methods which may result in significant resource savings. In one embodiment the Blacklist would be downloaded at the start of the program and stored in local memory for the entire scanning process. In another embodiment the Blacklist may be downloaded at a less frequent interval, such as weekly or monthly and stored between executions of the program. In another embodiment, the Blacklist may be updated only upon specific command by the user. In other embodiments the Blacklist may be included with the program when it is first installed. One skilled in the art would appreciate that there is a balance between having the latest Blacklist and the resource utilization acquiring the Blacklist. Different situations would require different decisions, all of which are encompassed by this disclosure.

Some Subscriptions may contain the standard "List-Unsubscribe" header (208). This header identifies the email message as a potential Subscription. If the header contains a mailto header, then a unsubscribe email can be created (209) and stored until the sender selects to unsubscribe from the Subscription. In an alternative embodiment the system may simply log this mailto: address and not create the unsubscribe email until after the sender select to unsubscribe from the Subscription. In either situation information about the header, either the email, or the mailto: address is added to the "Automatically Unsubscribe" queue. The Automatically Unsubscribe queue is a list of Subscriptions in which clearly identified methods of unsubscribing have been established.

Some List-Unsubscribe headers may contains a URL (211), then the URL is added to the Automatically Unsubscribe queue (212). At this point no further processing of the header is necessary. In the event that the email has been identified as a Non-Subscriptions email, or has clearly been identified as a Subscription with a clearly identified method of unsubscription, then no further processing is necessary. The system will move on to the next email.

If the email has not been clearly identified, then the contents of the email must be downloaded and examined. The body of the email is compared to previously examined bodies to avoid processing duplicate information. One skilled in the art would appreciate that several methods of establishing duplicity exist. In one embodiment the email body could be hashed and the hash values compared across different emails. In another embodiment specific sub samples of the email contents could be identified and compared. For example if the first, third and last sentences of the emails are identical, then there is a high probability the rest of the email is identical. If the emails contain the same URLs and/or the same images, then there is a high probability that the rest of the emails' content will be identical.

If the email content is established as unique (i.e. not a duplicate to one already processed), then the content is scanned for unsubscription information and added to the appropriate queue (215). See FIG. 3 for further details.

Once all emails have been processed, the system will have an "Automatically Unsubscribed" queue, a Unsubscribe Blacklist (UBL), and a URL list. At this point processing stops (216).

Figure 3:
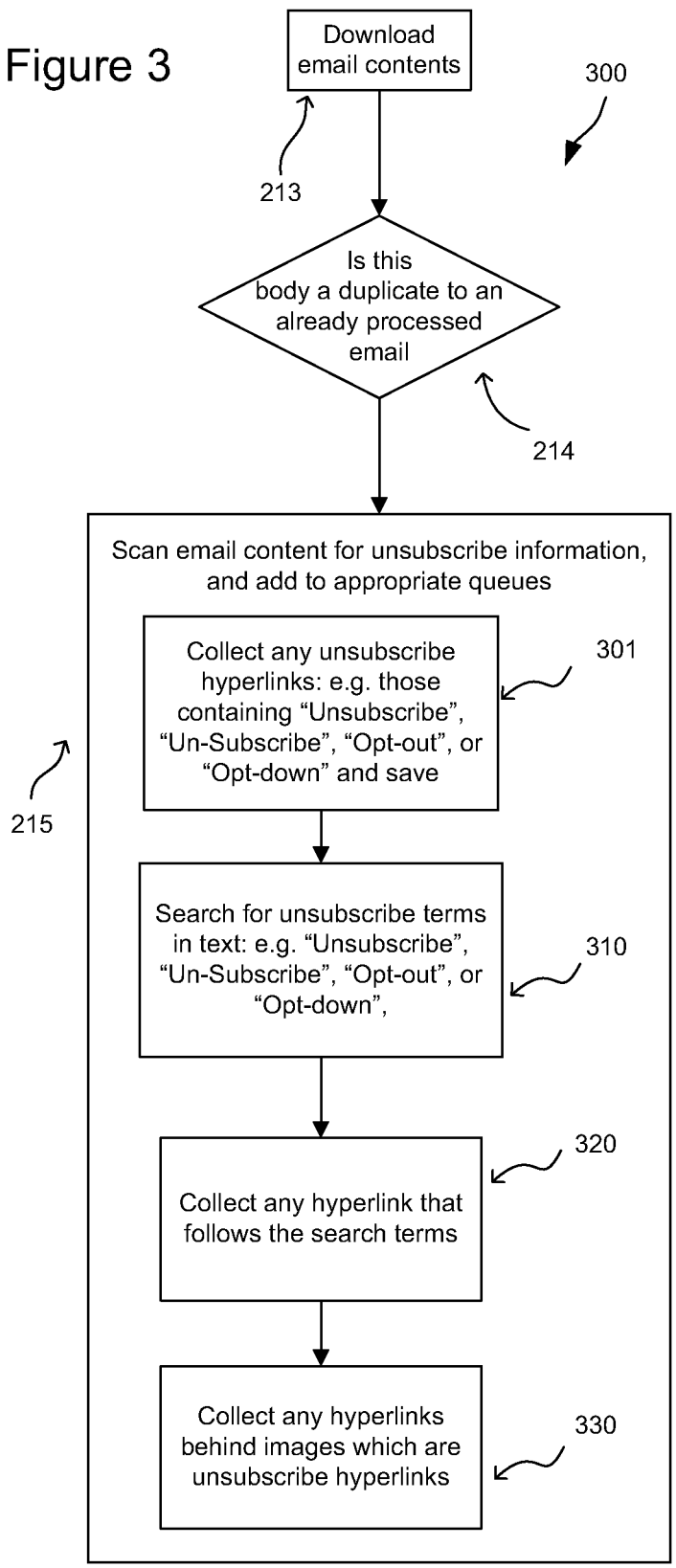
FIG. 3 further illustrates a method for identifying subscriptions and collecting the information necessary to unsubscribe from each subscription in accordance with an exemplary embodiment of the invention.

FIG. 3 further illustrates a method for identifying subscriptions and collecting the information necessary to unsubscribe from each subscription in accordance with an exemplary embodiment of the invention. As established above, not every email's contents must be downloaded to determine if the email is part of a Subscription, or to identify the method of unsubscription. FIG. 3 examines in detail the process (215), described above, by which the email's contents are scanned for unsubscribe information and added to appropriate queues.

First, all URL hyperlinks ("Links") in the email content are examined and any one identified as an unsubscribe Link are added to the URL list (301). Links are identified as unsubscribe links if they contain key phrases which are commonly utilized in identifying such links. Examples of such phrases include, but are not limited to the following: "Unsubscribe", "Un-subscribe", "Opt-out", "Opt-down", "Modify", "Update", "Preferences", "Contact Us" and "Click Here". Further, one skilled in the art would appreciate that the terms above may be in alone or in combinations, further they may differ in case, puralization, spacing, and in other ways.

Next, text is searched for unsubscription terms (310), and any hyperlink which follows such terms within a certain threshold are identified as potential unsubscribe Links and are added to the URL list (320). Terms are identified as unsubscribe terms if they contain key phrases which are commonly used to signify to a user an unsubscription operation. Examples of such phrases include, but are not limited to the following: "Unsubscribe", "Un-subscribe", "Opt-out", "Opt-down", "Modify", "Update", "Preferences", "Contact Us" and "Click Here". Further, one skilled in the art would appreciate that the terms above may be in alone or in combinations, further they may differ in case, puralization, spacing, and in other ways.

The preferred embodiment uses a threshold of 30 characters. As such, once a key term is identified, the next 30 characters following the term are examined and any Link included, or beginning within the threshold limit is identified as a potential unsubscription link. One skilled in the art would appreciate that the threshold could be higher or lower. If a threshold is set too low, then one would risk missing unsubscription links which were further away than the threshold amount. If the threshold is set too high, then one would risk capturing innocuous links and thus waste system resources in processing them, or annoy users with "false positives."

In other embodiments the threshold may be determined based on the term matched, or the complexity of the term matched. i.e. a match on the term "click here" may only have a threshold of 5 characters. But a match on the term "to unsubscribe" may warrant a higher threshold of 20 characters.

Next images in the email content are examined and any hyperlinks behind them are selected (330). Many images contain unsubscribe hyperlinks which are hidden behind the image and activated by clicking on the image. The image may or may not contain any significant information to identify the purpose of clicking on the image, therefore the actual image may be insignificant. It is the fact that the image contained a hyperlink which was activated by clicking on the image.

Figure 4:
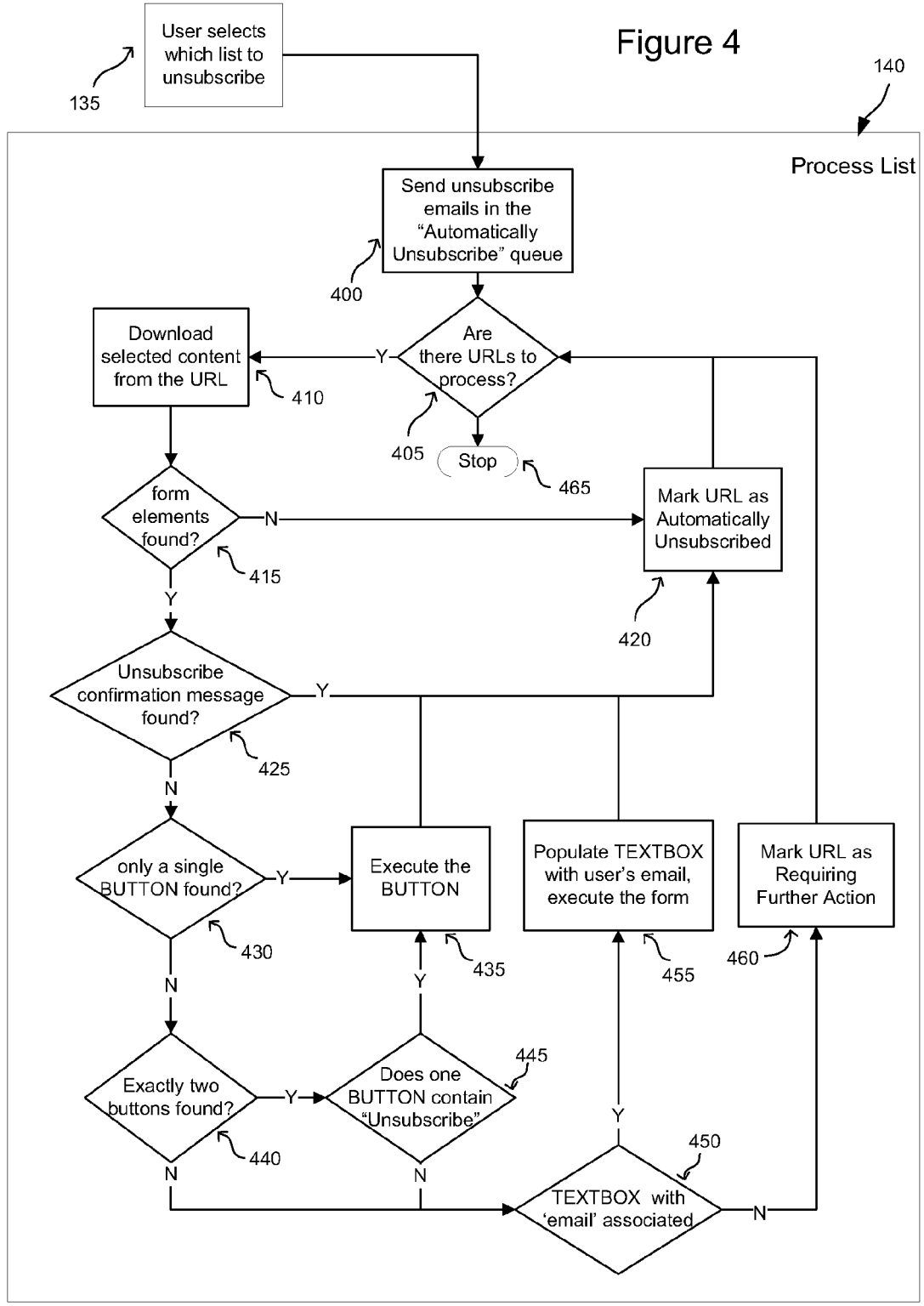
FIG. 4 illustrates a method for unsubscribing an address from subscriptions in accordance with an exemplary embodiment of the invention.

FIG. 4 illustrates a method for unsubscribing an address from subscriptions in accordance with an exemplary embodiment of the invention. Once a user selects which Subscriptions they wish to unsubscribe (135), the list must be processed (140) to determine how to unsubscribe each Subscription.

Any Subscriptions which are identified or associated with entries in the Automatically Unsubscribe" queue are easily dispatched (400) as there are clearly identified methods of unsubscription identified for such entries. Next the URLs are processed (405). First the URLs on the Automatically Unsubscribe queue are processed, then others.

To process the URLs in an automated fashion, the content of the selected URL is downloaded (410). The contents are examined to look for form elements (415). Form elements include, but are not limited to: checkboxes, radio buttons, input boxes, etc. If form elements are not found, then, the URL is presumed to be a confirmation URL, and it is marked as "Automatically unsubscribed" (420). This type of URL is often used with a web based List-Unsubscribe header.

If form elements are found (415) then the webpage is examined for a confirmation message (425). If a confirmation message is found on the page, then the URL is presumed to be a confirmation URL, and it is marked as "Automatically unsubscribed" (420). Examples of confirmation messages include but are not limited to the following: "successfully unsubscribed", "unsubscribe successful", "you are unsubscribed", "you have been unsubscribed", "unsubscribe complete", "email address has been removed". One skilled in the art would appreciate that other messages could be construed as confirmation messages. Further, one skilled in the art would appreciate that exact matches to the messages are not necessary in identifying the messages. The messages may differ in pluralization, capitalization, or may be subsets of certain words. As an example the wildcard "succ*" would match "succeed", "success", "successful", "successfully". One skilled in the art would appreciate there are other ways in which the contents of the webpage may be identified by the program as a confirmation message.

If a confirmation message is not identified on the webpage, then the form elements are examined. If a single button element is found, (430), then the button is executed (435) and the URL is marked as "Automatically unsubscribed" (420). This is for the common practice where a confirmation is utilized on the webpage to ensure the user really intended to unsubscribe, and didn't navigate to the hyperlink unintentionally by clicking erroneously on the email message.

If a webpage has two buttons elements (440), then one button is examined to see if one of the buttons can be identified as performing the unsubscribe function (445). Examples would include, but not be limited to, a button which is identified as "Unsubscribe", or a button identified as "Yes" or some other positive message were the webpage contains a question asking if the user would like to unsubscribe. If a button can be identified, then execute the button (435), and the URL is marked as "Automatically unsubscribed" (420).

If a webpage contains a textbox form element, which has the term email associated with it (450), the textbox is populated with the user's email and the form is executed (455), and the URL is marked as "Automatically unsubscribed" (420).

If all of the above has been attempted unsuccessfully, then the URL is marked as "Requiring Further Action". If a URL associated with a particular Subscription is added to the queue or marked as "Automatically Unsubscribed" then all other URL's are marked or otherwise ignored. Once a single successful unsubscription action occurs for a given Subscription, no further attempts to unsubscribe the Subscription are necessary.

If all methods have been attempted for a particular Subscription, then each of the URLs on the "Requiring Further Action" list may be presented to the user in a manner that allows the user to easily open each URL in a browser and attempt to complete the unsubscription manually. After each browser closes, the program may optionally inquire of the user if the unsubscription operation was successful. In the event the user answer in the affirmative, then no further unsubscription methods associate with the particular Subscription need be presented to the user for manual attempts at unsubscription.

In each of the above examples the messages were presented in English. One skilled in the art would appreciate that the same operations could necessarily be performed in the same or a similar manner in other languages. Further other methods could be utilized to convey the information to the user including but not limited to the use of colors or icons to indicate the progress or status of each message and each Subscriptions. Further a combination could be employed to allow the system to detect and unsubscribe messages in multiple languages. The system could attempt to identify the language of the Subscription emails in order to determine the most probably language utilized on the unsubscription methods.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of processing subscriptions comprising:
identifying one or more email accounts;
accessing the mailboxes associated with the email accounts;
processing, at least a subset of the email messages in the mailboxes to identify those originating with a subscription list;
processing, at least one email message associated with a subscription list to identify methods of unsubscribing from the subscription;
wherein identifying methods of unsubscribing from the subscriptions further comprises:
identifying list-unsubscribe headers in a message header; or
identifying unsubscribe methods within the message body;
presenting to the user the subscriptions previously identified: and
unsubscribing from, at least a single subscription in response to a user requests;
wherein identifying unsubscribe methods within the message body further comprises:
collecting unsubscribe hyperlinks from the message body; and
identifying those hyperlinks as potential unsubscription methods.

2. A method, as described in claim 1 wherein processing email messages
further comprises:
identifying non-subscriptions by text prepended to subjects; and/or
identifying non-subscriptions by user address.

3. A method, as described in claim 1 wherein processing email messages
to identify those originating with a subscription list further comprises:
identifying subscriptions by the inclusion of list-unsubscribe headers in the email header.

4. A method, as described in claim 1 wherein processing email messages
to identify those originating with a subscription list further comprises:
verifying senders are not included in an Unsubscribe Blacklist.

5. A method, as described in claim 1 wherein identifying unsubscribe
methods within the message body further comprises:
searching for unsubscribe text in a message body;
collecting hyperlinks which begin within a threshold amount after the unsubscribe text; and
identifying those hyperlinks as potential unsubscription methods.

6. A method, as described in claim 1 wherein identifying unsubscribe
methods within the message body further comprise:
collecting hyperlinks which are associated with images; and
identifying those hyperlinks as potential unsubscription methods.

7. A method, as described in claim 1 wherein unsubscribing from a subscription
comprises:
sending unsubscribe emails to sending email of subscription messages.

8. A method, as described in claim 1 wherein unsubscribing from a subscription
comprises:
sending unsubscribe emails to mailto: address found in a list-unsubscribe header.

9. A method, as described in claim 1 wherein unsubscribing from a subscription
comprises:
processing one or more URLs found in a message to unsubscribe from subscriptions.

10. A method, as described in claim 9 wherein processing a URL comprises: opening a browser; navigating to the URL; downloading the webpage located at the URL; identifying a lack of form elements on the webpage.

11. A method, as described in claim 9 wherein processing a URL comprises: opening a browser; navigating to the URL; downloading the webpage located at the URL; identifying only a single button element on the webpage; and executing the button on the webpage.

12. A method, as described in claim 9 wherein processing a URL comprises: opening a browser; navigating to the URL; downloading the webpage located at the URL; identifying only two button elements on the webpage; determining the unsubscribe button; and executing the unsubscribe button on the webpage.

13. A method, as described in claim 9 wherein processing a URL comprises: opening a browser; navigating to the URL; downloading the webpage located at the URL;
presenting the webpage to the user for manual unsubscription from the subscription.

14. A computing system configured to process subscriptions to list servers, said configuration comprised of:
identifying one or more email accounts;
accessing the mailboxes associated with the email accounts; and
processing, at least a subset of the email messages in the mailboxes to identify those originating with a subscription list;
processing the body text of at least one email message associated with a subscription list to identify mailto: and URLs to utilize to unsubscribe from the subscription;
presenting to a user the subscriptions previously identified; and
unsubscribing from, at least a single subscription in response to a user request;
presenting to the user the subscriptions previously identified; and
unsubscribing from, at least a single subscription in response to a user requests;
wherein identifying unsubscribe methods within the message body further comprises:
collecting unsubscribe hyperlinks from the message body; and
identifying those hyperlinks as potential unsubscription methods.

15. A system, as described in claim 14 wherein unsubscribing from, at least a single subscription further comprises:
sending unsubscribe emails to sending emails of subscription messages;
sending unsubscribe emails to mailto: address found in a list-unsubscribe header;
processing one or more URLs found in a message to unsubscribe from subscriptions, wherein said processing comprises:

retrieving the contents of a webpage associated with the URL; identifying a lack of form elements on the webpage; or identifying only a single button element on the webpage; and executing the button on the webpage;

identifying only two button elements on the webpage; determining the unsubscribe button; and executing the unsubscribe button on the webpage; or presenting the webpage to the user for manual unsubscription from the subscription.

16. A computing apparatus for processing subscriptions to list servers, wherein said apparatus:

identifies one or more email accounts; accesses the mailboxes associated with the email accounts;

and processes, at least a subset of the email messages in the mailboxes to identify those originating with a subscription list;

processes the body text of at least one email message associated with a subscription list to identify mailto: and URLs to utilize to unsubscribe from the subscription;

presents to the user the subscriptions previously identified; and in response to an initiation command from a user, automatically unsubscribes from, at least a single subscription;

presenting to the user the subscriptions previously identified; and unsubscribing from, at least a single subscription in response to a user requests;

wherein identifying unsubscribe methods within the message body further comprises:

collecting unsubscribe hyperlinks from the message body; and identifying those hyperlinks as potential unsubscription methods.

17. An apparatus as described in claim 16 wherein automatically unsubscribing from, at least a single subscription in response to a user request further comprises:

sending unsubscribe emails to sending emails of subscription messages; sending unsubscribe emails to mailto: address found in a list-unsubscribe header;

processing one or more URLs found in a message to unsubscribe from subscriptions, wherein said processing comprises:

retrieving the contents of a webpage associated with the URL; identifying a lack of form elements on the webpage; or identifying only a single button element on the webpage; and executing the button on the webpage;

identifying only two button elements on the webpage;

determining the unsubscribe button; and executing the unsubscribe button on the webpage; or presenting the webpage to the user for manual unsubscription from the subscription.

* * * * *